(12) United States Patent
Shray et al.

(10) Patent No.: US 7,716,880 B1
(45) Date of Patent: May 18, 2010

(54) COMPOSITE PRODUCTS AND METHODS OF PRODUCING SAME

(75) Inventors: Frank Shray, Polo, IL (US); Steven Hollingworth, Cheyenne, WY (US); Dale Harrison, West Chicago, IL (US); Colin Felton, Madison, WI (US)

(73) Assignee: Teton West Lumber, Inc., Cheyenne, WY (US)

( * ) Notice: Subject to any disclaimer, the term of this patent is extended or adjusted under 35 U.S.C. 154(b) by 0 days.

(21) Appl. No.: 10/219,395

(22) Filed: Aug. 14, 2002

Related U.S. Application Data (60) Provisional application No. 60/312,142, filed on Aug. 14, 2001.

(51) Int. Cl.
*E04B 2/82* (2006.01)

(52) U.S. Cl. .................. 52/126.1; 248/188.2; 52/127.2; 52/213; 52/309.1

(58) Field of Classification Search ............... 52/126.1, 52/309.1, 309.4, 126.2, 717.04, 126.3, 165.5, 52/127.2, 213, 215, 217, 126.5, 309.2; 292/343, 292/342, 355; 254/104, 88; 248/188.2, 649, 248/188.3, 346.01, 346.02, 346.05; D8/47, D8/402, 354; 144/193.2, 193; 340/546; D6/467, 469
See application file for complete search history.

(56) References Cited

U.S. PATENT DOCUMENTS

| | | | | |
|---|---|---|---|---|
| 171,807 A * | 1/1876 | Hoffman | ............... | 292/343 |
| 804,585 A * | 11/1905 | Depue | ............... | 292/343 |
| 1,351,453 A * | 8/1920 | Wells | ............... | 292/343 |
| 1,541,971 A * | 6/1925 | Lampert | ............... | 254/104 |
| 1,915,320 A * | 6/1933 | Jones | ............... | 248/188.2 |
| 1,939,402 A * | 12/1933 | Moser | ............... | 292/343 |
| 2,123,484 A * | 7/1938 | Mafera | ............... | 254/104 |
| 2,166,444 A * | 7/1939 | Kinninger et al. | ........... | 254/104 |
| 2,300,485 A * | 11/1942 | Bristow | ............... | 52/769 |
| 2,459,070 A * | 1/1949 | Gard | ............... | 292/343 |
| 2,524,961 A * | 10/1950 | Cramer | ............... | 254/104 |
| 2,539,703 A * | 1/1951 | Sato | ............... | 254/104 |
| 2,772,596 A * | 12/1956 | Trussell | ............... | 411/535 |
| 3,171,635 A * | 3/1965 | Jines | ............... | 366/286 |
| 3,185,442 A * | 5/1965 | Hemphill | ............... | 254/104 |
| 3,601,438 A * | 8/1971 | Stuart | ............... | 292/253 |
| 3,647,607 A * | 3/1972 | Hillers | ............... | 428/139 |
| 3,939,987 A | 2/1976 | Bustos et al. | | |
| 4,017,939 A * | 4/1977 | Schofield | ............... | 16/82 |
| 4,135,335 A * | 1/1979 | Jensen | ............... | 52/126.1 |

(Continued)

OTHER PUBLICATIONS

Investing in Trex, Trex Co. Investor Overview, Corporate Profile, http://www.corporate-ir.net, Oct. 1999, pp. 1-8.

(Continued)

*Primary Examiner*—Richard E Chilcot, Jr.
*Assistant Examiner*—William V Gilbert
(74) *Attorney, Agent, or Firm*—K&L Gates LLP (57) ABSTRACT

Composites, products made from composites and method of producing same are provided. The present invention includes an injection moldable product made from a composite material at least composed of balanced mixture of thermoplastics and fibrous components. The injection moldable product is formed into a body that has a wedge-shape, a shim-shape or the like wherein the body includes one or more cored regions extending though at least a portion thereof.

17 Claims, 5 Drawing Sheets

U.S. PATENT DOCUMENTS

| | | | |
|---|---|---|---|
| 4,144,296 A | | 3/1979 | Dickens |
| 4,178,658 A * | | 12/1979 | Gergonne .................. 16/86 A |
| 4,240,557 A * | | 12/1980 | Dickens .................... 211/153 |
| 4,451,024 A * | | 5/1984 | Shepherd ................... 254/104 |
| 4,579,377 A * | | 4/1986 | Dallaire et al. .............. 292/343 |
| D284,738 S * | | 7/1986 | Stone .......................... D8/402 |
| 4,625,489 A * | | 12/1986 | Bogle ........................... 52/712 |
| 4,660,323 A * | | 4/1987 | Kanies ........................... 49/70 |
| 4,688,761 A * | | 8/1987 | Wilcox ....................... 254/104 |
| 4,713,922 A * | | 12/1987 | Ingold ....................... 52/656.2 |
| 4,776,548 A * | | 10/1988 | Bezenek ................... 248/188.2 |
| 4,830,320 A * | | 5/1989 | Bellows .................... 248/188.2 |
| 4,867,315 A * | | 9/1989 | Baldwin ..................... 206/558 |
| 4,881,293 A * | | 11/1989 | Reynolds ................... 16/86 A |
| 4,895,892 A * | | 1/1990 | Satake et al. ................. 524/520 |
| 4,911,270 A * | | 3/1990 | Hudson ........................ 188/32 |
| 5,011,203 A * | | 4/1991 | Tackett ....................... 292/343 |
| 5,054,250 A * | | 10/1991 | Foss ........................... 52/126.1 |
| 5,085,938 A * | | 2/1992 | Watkins ....................... 428/378 |
| 5,086,096 A * | | 2/1992 | Kosinski ....................... 524/36 |
| 5,213,865 A * | | 5/1993 | Yamada ......................... 428/92 |
| D336,181 S | | 6/1993 | Muniz |
| 5,217,269 A * | | 6/1993 | Wiltberger .................. 292/343 |
| 5,249,767 A * | | 10/1993 | Mellen .................... 248/188.2 |
| 5,263,551 A * | | 11/1993 | Andersen .................... 182/200 |
| 5,290,012 A * | | 3/1994 | Cottriel et al. ............... 254/104 |
| 5,340,176 A * | | 8/1994 | Cresci ........................ 292/343 |
| 5,368,349 A * | | 11/1994 | Hebert et al. ................ 292/343 |
| 5,480,602 A * | | 1/1996 | Nagaich ...................... 264/122 |
| 5,484,895 A * | | 1/1996 | Meister et al. .............. 530/500 |
| 5,516,472 A | | 5/1996 | Laver |
| 5,537,718 A * | | 7/1996 | Nagatsuka et al. ............. 19/302 |
| 5,547,238 A * | | 8/1996 | Payette ....................... 292/343 |
| 5,611,514 A * | | 3/1997 | Oliver et al. ................. 248/357 |
| 5,640,813 A | | 6/1997 | Glazik et al. |
| 5,651,816 A * | | 7/1997 | Kobayashi et al. ........ 106/38.35 |
| 5,661,200 A * | | 8/1997 | Boudreaux et al. .......... 523/436 |
| 5,711,560 A * | | 1/1998 | Gilbertson .................. 292/343 |
| 5,719,206 A * | | 2/1998 | Mihoya et al. .............. 523/212 |
| 5,815,992 A * | | 10/1998 | Wells et al. ................. 52/126.1 |
| 5,853,838 A | | 12/1998 | Siems et al. |
| D406,028 S * | | 2/1999 | Montgomery ................. D8/47 |
| D410,380 S * | | 6/1999 | Towns ......................... D8/402 |
| 5,922,411 A * | | 7/1999 | Shimizu et al. .......... 427/397.7 |
| 5,953,862 A | | 9/1999 | Earhart et al. |
| 6,013,774 A * | | 1/2000 | Meister et al. .............. 530/507 |
| 6,018,010 A | | 1/2000 | Yamazaki et al. |
| 6,018,916 A * | | 2/2000 | Henry ........................ 52/126.1 |
| 6,024,364 A * | | 2/2000 | Steffen ........................ 277/645 |
| D421,374 S * | | 3/2000 | Montgomery ................. D8/47 |
| 6,041,473 A * | | 3/2000 | Johnson ......................... 16/82 |
| 6,083,860 A * | | 7/2000 | Matsuo et al. ................. 501/92 |
| 6,117,606 A * | | 9/2000 | Macholdt et al. ........ 430/108.23 |
| 6,155,004 A * | | 12/2000 | Earhart et al. .................. 52/98 |
| 6,164,588 A * | | 12/2000 | Jacobsen .................. 242/610.4 |
| 6,230,446 B1 | | 5/2001 | Chalich |
| 6,231,970 B1 * | | 5/2001 | Andersen et al. ............ 428/332 |
| 6,311,537 B1 * | | 11/2001 | Vigil ............................ 72/392 |
| 6,342,172 B1 * | | 1/2002 | Finley ....................... 264/45.3 |
| 6,345,849 B1 * | | 2/2002 | Yen ............................ 292/343 |
| 6,347,494 B1 * | | 2/2002 | Noirot ....................... 52/309.4 |
| 6,497,956 B1 * | | 12/2002 | Phillips et al. .............. 428/376 |
| 6,551,690 B2 * | | 4/2003 | Dwinell ..................... 428/156 |
| 6,605,146 B2 * | | 8/2003 | Greco et al. ................ 106/400 |
| 6,616,128 B2 * | | 9/2003 | Selzer ........................ 254/104 |
| 6,758,996 B2 * | | 7/2004 | Monovoukas et al. .... 264/176.1 |
| 2002/0040557 A1 | | 4/2002 | Felton |
| 2002/0157328 A1 | | 10/2002 | Holder |

OTHER PUBLICATIONS

Stark, Nicole M., *Wood Fiber Derived from Scrap Pallets Used in Polypropylene Composites*, Composites and Manufactured Products, Forest Products Journal, Jun. 1999, vol. 49, No. 6, pp. 39-46.

Colvin, Robert, *Machine suppliers cater to growing market for extruded wood profiles*, Plastiscope, News and Interpretation, Nov. 2000, pp. 26-27.

Leaversuch, Robert D., *Composite extrusion takes aim at wood, PVC profiles*, Modern Plastics, Jun. 1996, p. 79.

Jacobson, et al., *Property Improvement Effects of Agricultural Fibers and Wastes as Reinforcing Fillers in Polypropylene-Based Composites*, Jacobson, Rowell, Caulfield, and Sanadi, Woodfiber-Plastic Composites, May 1995, pp. 211-219.

Stark, Nicole, *Effect of Species and Particle Size on Properties of Wood-Flour-Filled Polypropylene Composites*, Functional Fillers for Thermoplastics & Thermosets, Dec. 8-10, 1997, LeMeridien at Coronado, San Diego, California, pp. 1-21.

Clemons, Craig, *Wood-Plastic Composites in the United States, The Interfacing of Two Industries*, Forest Products Journal, vol. 52, No. 6, Jun. 2002, pp. 10-18.

English, et al., Weight Reduction: *Wood versus Mineral Filers in Polypropylene*, Fourth International Conference on Woodfiber-Plastic Composites, The Madison Concourse Hotel, Madison, Wisconsin, May 12-14, 1997, pp. 237-244.

* cited by examiner

COMPOSITE PRODUCTS AND METHODS OF PRODUCING SAME

RELATED APPLICATION DATA

The present application claims priority to U.S. Patent Application Ser. No. 60/312,142 filed on Aug. 14, 2001.

BACKGROUND

The present invention generally relates to composites and products made from composites. More specifically, the present invention relates to composite products with a tapered body, such as shims, wedges and/or the like, and methods of producing same.

In general, composites and products made from composites are known and used in the market place. For example, composite products have been known and used as substitutes for products made from wood. In this regard, wood composite products have been used, for example, as a substitute for outdoor decking material made from wood.

As a wood substitute, composite products may exhibit similar, if not better, consistency of properties, such as compression strength, water resistance, pest resistance, rot resistance and/or the like, as compared to wood. In this regard, composites are generally made from a combination of plastics and a wood material, such as wood flour derived from a variety of different wood sources. Depending on the particular use, the composites are typically formed into an extruded product of varying sizes and shapes.

Within the manufactured home industry, for example, there exists a need for low cost and consistent performance in shims, wedges and/or the like. Wood shims and/or wood wedges typically vary with respect to properties and dimensions resulting in increased labor costs during use. In general, shims are utilized to position and level doors, windows, cabinets, framing and the like prior to being secured in place. In general, wedges are used to set and/or level heavy weight bearing objects, such as manufactured homes. Pre-made shims or setting wedges can facilitate operation due to the fact that extra time and effort does not have to be expended, for example, in sorting through a random assortment of commercially available wood shims for one with the necessary dimensions and quality.

However, wood shims, pre-made or otherwise, can split when a nail or nails are driven through a door jamb, for example, and subsequently into the shim to secure the door. This may result in having to replace the split shim and thus ultimately having to re-position the jamb. Further, once the shim has been secured in place, a portion of it generally needs to be removed such that it remains flush with, for example, the door jamb. In this regard, wood shims may not break cleanly or evenly when a portion is removed and thus can leave a jagged edge which may need additional cutting. Wood wedges can be problematic as well due to the fact that they are susceptible to slippage and/or compression over time under weight bearing use. This can cause shifting of the weight bearing objects, such as shifting of manufactured homes, set on the wood wedges.

A need, therefore, exists to provide composite products, such as shims and/or wedges, that can be readily manufactured and that have improved qualities, such as durability with resistance to split, splinter, swell, warp and twist, as compared to, for example, wood-made products.

SUMMARY

The present invention generally relates to composites, products made from composites and methods of making same. The present invention includes composites that are at least made from a mixture of thermoplastics and a fibrous component. The composite can be formed into a variety of different molded products, particularly molded building materials, such as composite shims, composite wedges and/or the like. The composite products of the present invention have improved properties, for example, as compared to shims or wedges made from wood, such as resistance to splitting, rot, insects, greater compression strength and durability and/or the like. In this regard, the composite products of the present invention can be a desirable substitute for wood-made products in a variety of different applications, such as applications relating to the manufactured home industry.

To this end, in an embodiment of the present invention, an injection moldable product is provided. The injection moldable product includes a tapered body with one or more cored regions extending through at least a portion of the body wherein the body is composed of a composite material including a fibrous component, a thermoplastic component and a coupling agent.

In an embodiment, the thermoplastic component includes a polypropylene, polyethylene, polyesters, polystyrene, polycarbonate, polyvinylchloride, poly (methyl methacrylate), nylon, copolymers thereof, the like and combinations thereof.

In an embodiment, the fibrous component includes synthetic fiber, such as carbon fiber and/or the like, cellulosic material, natural fiber(s), wood flour, birch wood flour, spruce wood flour, pine wood flour, fir wood flour, maple wood flour, rice hull, peanut shells, recyclable wood waste, recyclable paper, flax sheeve, the like and mixtures thereof.

In an embodiment, the coupling agent includes a copolymer of maleic acid and polypropylene, a copolymer of maleic acid and polyethylene, maleic acid, polyethylene, the like and mixtures thereof.

In an embodiment, the coupling agent ranges from about 3% or less by weight of the shim.

In an embodiment, the composite material includes an additional component that includes a pigment, a scent agent, an ultraviolet light stabilizing agent, a filler, a natural filler including talc and calcium carbonate, a heat stabilizer, an antioxidant, a foaming agent, a fungicide, the like and combinations thereof.

In an embodiment, the thermoplastic component comprises about 30% to about 70% by weight of the injection moldable product and the fibrous component comprises about 30% to about 70% of the injection moldable product.

In another embodiment, a composite shim is provided. The composite shim includes a base material including a fibrous component and a thermoplastic component wherein the base material is formed into a shim-shaped body that has one or more cored regions extending into a portion of the shim-shaped body.

In yet another embodiment, an injection moldable wedge is provided. The injection moldable wedge includes a wedge-shaped body composed of a composite base material including a fibrous component and a thermoplastic component wherein the wedge-shaped body has one or more cored regions extending through a portion of the wedge-shaped body.

In still yet another embodiment, a method of producing an injection moldable product is provided. The method includes the steps of mixing a thermoplastic component and a fibrous component; forming a composite base material at least including the thermoplastic component and the fibrous component; and molding the base material to form a tapered body wherein the body includes one or more cored regions extending through at least a portion thereof.

It is, therefore, an advantage of the present invention to provide improved composite material formulations, composite products, and methods of producing same.

Another advantage of the present invention is to provide improved composite products, such as shims, wedges and/or the like, that can be readily manufactured at reduced costs from a composite material including, for example, recyclable material, such as wood waste and/or the like.

Still another advantage of the present invention is to provide improved composite products that promote the sound recovery of wood waste and/or the like at the production level, thus encouraging recyclable use of such materials.

A further advantage of the present invention is to provide improved composite products that can be readily formed into an injection moldable product having desirable properties, such as durability, strength, resistance to splitting, water, insects, rot and the like.

A still further advantage of the present invention is to provide improved composite products that can be a desirable substitute for wood-made products, such as shims, wedges and/or the like.

Yet a still further advantage of the present invention is to provide an improved composite product that can be utilized in a variety of different applications including the building materials industry, such as the manufactured home industry.

Additional features and advantages of the present invention are described in, and will be apparent from, the following Detailed Description of the Invention and the figures.

BRIEF DESCRIPTION OF THE FIGURES

FIGS. 2A-2C illustrate another embodiment of the composite shim of the present invention.

FIGS. 4A and 4B illustrate a composite wedge according to an embodiment of the present invention.

FIGS. 5A and 5B illustrate a stack mold used during processing of the composite shim according to an embodiment of the present invention.

DETAILED DESCRIPTION

The present invention provides composites, products made from composites, such as composite shims, composite wedges and/or the like, and methods of producing same.

The composite product of the present invention includes a composite material that is at least composed of a thermoplastic component and a fibrous component. In an embodiment, the composite product is an injection moldable product that includes a body tapered to an edge, e.g., a tapered body, wherein the body includes one or more cored regions extending through at least a portion of the composite product. The tapered body can be molded into a variety of suitable shapes and sizes, such as a shim, a wedge and/or the like.

As used herein, the term "composite" or other like terms means a material that is composed of a mixture of two or more different components that when mixed together impart properties of the material components, such as the thermoplastic component and the fibrous component of the composite product according to an embodiment of the present invention. In this regard, the thermoplastic component, on its own, would result in a product that is, for example, rot resistant and rubbery, and, on its own, the fibrous component, particularly a wood-derived fibrous component, would result in a product, for example, that is stiff, that contains moisture and that is susceptible to rot. But, when combined, the fibrous component and the thermoplastic component result in a composite product that exhibits properties derived from both the fibrous component and the thermoplastic component thereby making the resultant composite product a desirable substitute for a wood-made product.

As used herein, the terms "shim" and "wedge" or other like terms describe two different types of composite products according to an embodiment of the present invention. In general, the term "shim" or other like terms means a product that is typically constructed and sized for the purpose of positioning and leveling doors, windows and the like prior to securing same in place for use. In general, the term "wedge" or other like terms means a product that is typically constructed and sized for the purpose of setting a weight-bearing object or objects, such as a manufactured home.

Applicants have discovered that a balanced blend of composite materials, such as a blend of thermoplastics and fibrous materials, can be effectively utilized to make a composite product with a tapered body for a variety of different applications. Applicants have found that the well balanced blend of composite materials in combination with specific structural features of the finished molded product can result in the composite product with a tapered body that has improved characteristics, such as durability, compression strength, resistance to moisture, insects, splitting, rot and the like, as compared to, for example, shims and/or wedges made from wood.

In this regard, the composite product of the present invention can provide a number of technological and economic advantages over traditional wood wedges and/or wood shims. Further, the composite products of the present invention can be made from recyclable composite materials, such as thermoplastics and natural and/or synthetic fibers including recyclable wood waste.

The composite product of the present invention can be made from a variety of different and suitable materials. In general, the composite product includes a balanced blend of thermoplastics and fibrous materials. In an embodiment, the composite blend also includes a coupling or binder agent to facilitate the binding of the thermoplastic and fiber components.

The thermoplastic component can include any suitable material. In this regard, it is preferred that the thermoplastic material be essentially composed of a thermoplastic that is more "tough" than "rigid" such that it does not break. In an embodiment, the thermoplastic component includes polypropylene, polyethlyene, polyesters, polystyrene, polycarbonate, polyvinylchloride, poly (methyl methacrylate), nylon, like materials and mixtures thereof. It should be appreciated that the present invention is not limited to a monomeric plastic and thus can include any suitable type of polymeric plastic, including polymers composed of at least two different monomeric components, such as polyethlyene, polyesters, polystyrene, polycarbonate, polyvinylchloride, poly (methyl methacrylate) or other like materials.

The fibrous components of the present invention can include any variety, number and mixture of suitable materials. For example, the fiber component can include synthetic fibers, natural fibers, cellulosic materials or combinations thereof. In an embodiment, the fibrous component includes synthetic fibers, such as carbon fibers, cellulosic materials, natural fibers, wood flour, birch wood flour, maple wood flour, spruce wood flour, pine wood flour, fir wood flour, rice hulls, peanut shells, recyclable wood waste, recyclable paper, flax sheeve, mixtures thereof and the like.

In this regard, the use of wood waste and/or other like fibrous components can promote recyclable use of such fibrous components. This can promote, for example, sound recovery of wood waste and/or the like at the production level, thus encouraging recycling of same.

The composite product of the present invention can include a variety of other materials in combination with the thermoplastic and fiber components. In an embodiment, the additional materials include coupling agents, binders, pigment, scent agents including cedar scent or other wood-like scent, ultraviolet light stabilizing agents, heat stabilizers, antioxidants, fillers, natural fillers including calcium carbonate, talc and/or the like, foaming agents, fungicides, other like components and combinations thereof.

As previously discussed, the coupling agent can be added to the balanced mixture of thermoplastics and fibrous material(s) to facilitate the binding of such materials. In an embodiment, the coupling agent includes a copolymer or grafted copolymer of maleic acid and polypropylene, a copolymer or grafted copolymer of maleic acid and polyethylene, maleic acid, polyethylene, other suitable materials and combinations thereof. The copolymer of maleic acid and polyethylene is preferably used with the thermoplastic component that includes polyethylene.

The various components, such as thermoplastics and fibers, of the composite product can be added in any suitable amount such that the balanced blend of composite materials can be effectively utilized to make a composite product with a tapered body and/or other suitable structural features. In an embodiment, the thermoplastic component ranges from about 30% to about 70% by weight of the composite product, the fiber components ranges from about 30% to about 70% by weight of the composite product and the coupling agent ranges from about 0% to about 3% by weight of the composite product.

Preferably, the fiber component includes a wood flour, such as birch wood flour, maple wood flour, spruce wood flour, pine wood flour, fir wood flour, the like or combinations thereof at about 40% by weight of the composite product, the thermoplastic component includes about 59% by weight of the composite product, and the coupling agent includes about 1% by weight of the composite product. The wood flour can include any suitable size. In an embodiment, the wood flour includes about 20 to about 60 mesh consistency, preferably about 40 mesh consistency.

In an embodiment, the composite product of the present invention includes the fiber component in an amount of about 40% by weight of the composite product with the remaining amounts of the composite product including the thermoplastic component and optionally the coupling agent and other additional ingredients in any suitable amount. It should be appreciated that the amount of the various components of the present invention can be added in any suitable amount to the extent that the desirable properties of the composite product are not compromised, such as strength, durability, resistance to splitting, rotting and/or the like.

Figures 1, 3:
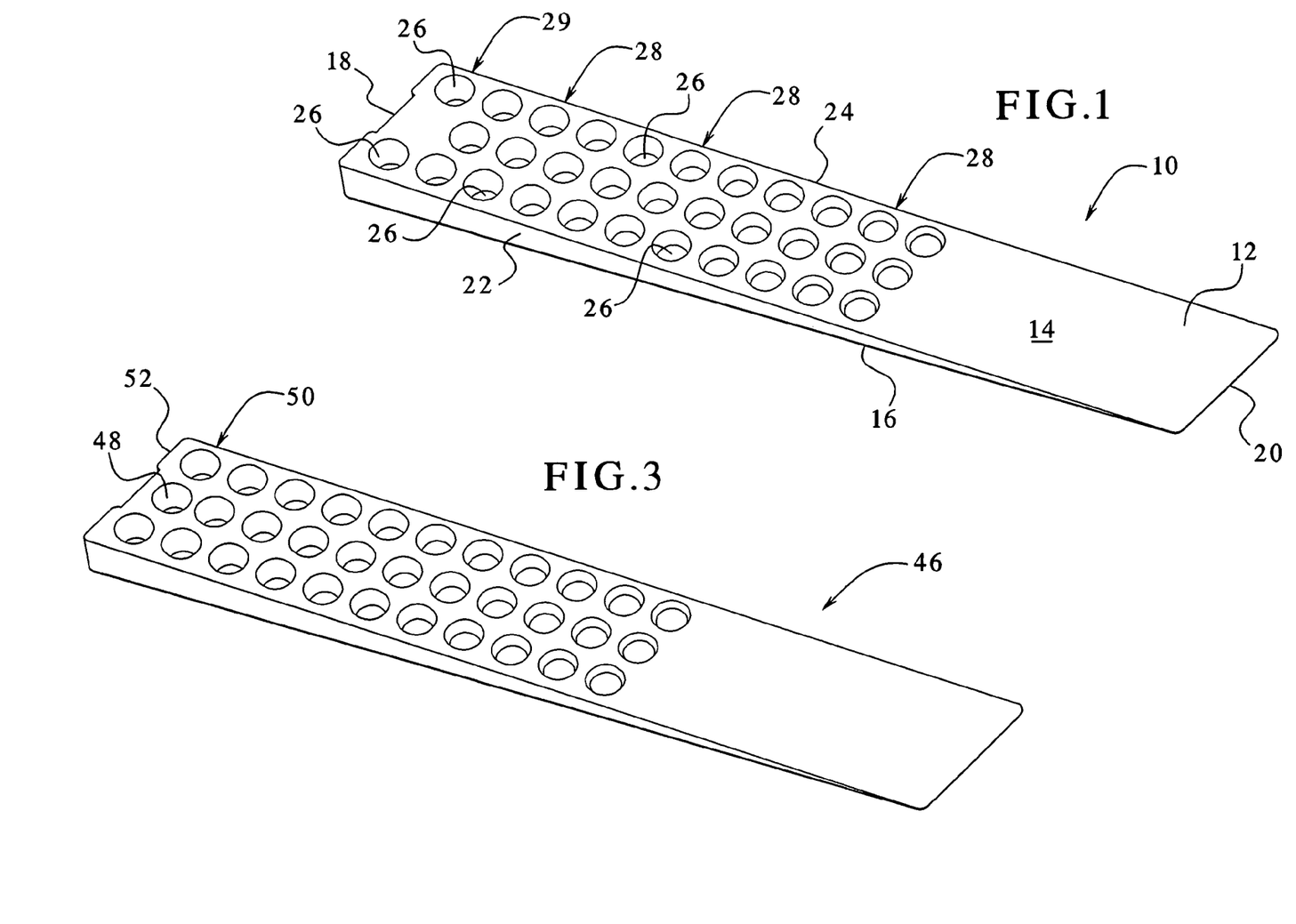
FIG. 1 is a perspective view of a composite shim according to an embodiment of the present invention.
FIG. 3 illustrates another embodiment of the composite shim of the present invention.

The composite product of the present invention can be formed into a variety of different shapes and sizes suitable for use in a variety of different applications, including residential, commercial or industrial use, such as building material for use, for example, in the manufactured home industry. In an embodiment, a composite shim is provided. The composite shim 10 includes a shim-shaped body 12 as illustrated in FIG. 1. In general, the shim-shaped body 12 is defined by five surface or face regions which connect or meet to form the shim-shaped body 12. The face regions 14 and 16 are distanced apart at an end region 18 and extend therefrom to meet at an edge 20 of the composite shim 10, thus forming the shim-shape. The other face regions 22 and 24 define the remaining portions of the shim-shape.

In an embodiment, the shim-shaped body 12 includes one or more or cored regions 26 extending into a portion of the body 12 and along at least a portion of the face region 14 of the shim-shaped body 12. As previously discussed, Applicants have uniquely discovered that the combination of a balanced blend of composite materials and the specific structural features of the finished molded product can provide a composite shim that has improved characteristics, such as strength, durability, resistance to splitting, the ability to break cleanly and evenly and the like, as compared to, for example, traditional wood shims. In this regard, the composite shim of the present invention can be desirably utilized as a substitute for wood shims.

The cored regions 26 of the composite shim 10 can include a variety of different suitable sizes, shapes and numbers and can be positioned in any suitable way with respect to the shim-shaped body 12 of the composite shim 10. Applicants have discovered that the addition of the cored regions 26 can provide a number of different beneficial effects with respect to the use and processing of the composite shim 10.

For example, Applicants have found that the composite shim 10 of the present invention is effectively resistant to splitting when a nail(s) is driven through it as compared to conventional wood shims. In this regard, Applicants believe that the cored regions 26 can act to reinforce the composite shim by providing an access region through which a nail can be easily driven. This can minimize, or effectively eliminate, the amount of force exerted by the nail to the remaining portion of the composite shim, and thus, the cored regions effectively halt the propagation of splitting caused by nailing. Further, the cored regions can reduce the cycle time for molding by increasing the cooling surface area, thereby causing the shim-shaped body to cool at a faster rate during injection molding.

Figure 2A:
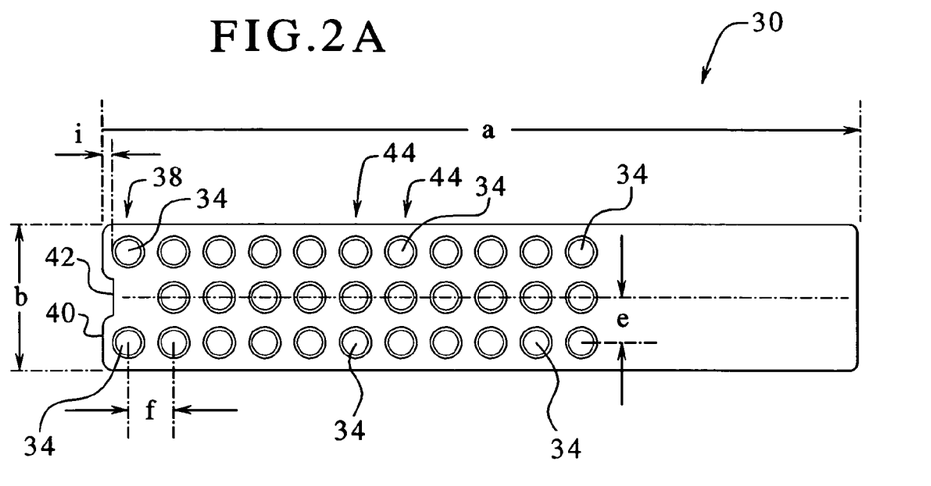
FIG. 2A illustrates a top view.

In an embodiment, the cored regions 26 are positioned along the face region 14 of the composite shim 10 in one or more rows 28 wherein a row 28 includes a number of cored regions 26, such as three cored regions to a row as illustrated in FIGS. 1 and 2A. As shown in FIGS. 1 and 2A, row 29 nearest the end region 18 includes two cored regions 26 according to an embodiment of the present invention. In an embodiment, the cored regions in a row or rows are spaced at an essentially equal distant from each other across the row and/or along the length of the shim. In addition, the rows are spaced at an essentially equal distant from one another along the face region 14 of the shim 10 as illustrated in FIGS. 1 and 2A. This allows the composite shim to be made at a reduced moisture content due to the fibrous component. If the moisture content is too high, the composite shim can expand during processing. In this regard, the cored regions allow the composite shim to be made at a reduced moisture content and at a reduced weight while not compromising the structural integrity of the composite shim.

The cored regions 26 can include a variety of different and suitable shapes and sizes. In an embodiment, the cored regions 26 include a cylindrical shape as shown in FIGS. 1 and 2A. In an embodiment, the cylindrical cored regions extend into a portion of the tapered body of the shim. However, the cored regions can be shaped in any suitable manner, such as a diamond-shape, square-shape, triangular-shape and/or other suitable geometric-shape.

Figure 2B:
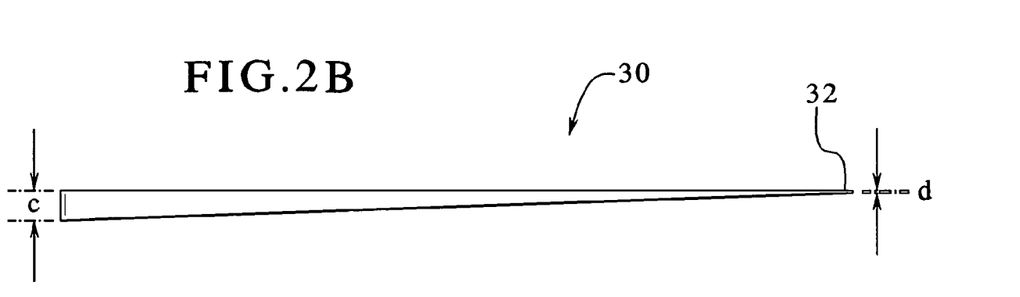
FIG. 2B illustrates a side view taken along a length of the composite shim of FIG. 2A.
Figure 2C:
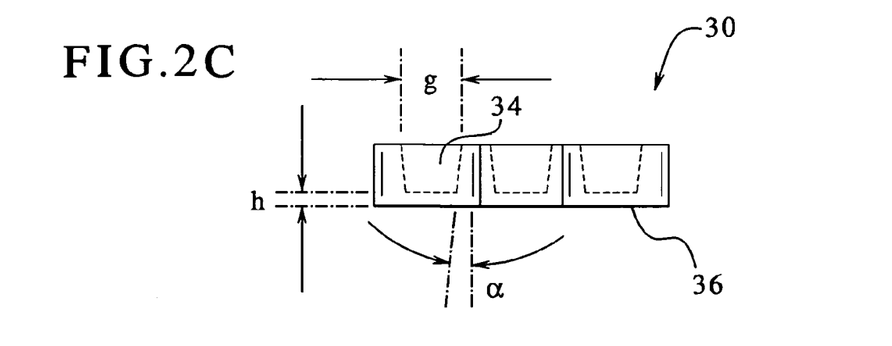
FIG. 2C illustrates a side view sectional of the composite shim of FIG. 2A.

It should be appreciated that the composite shim of the present invention can be molded with precision and accuracy into a variety of different and suitable shapes, sizes and configurations. An embodiment is illustrated in FIGS. 2A-2C. In general, the composite shim 30 has a shim-shaped configuration as shown in FIGS. 2A and 2B. The length a, width b and thickness c of the composite shim is approximately 8.0 inches, 1.5 inches and 0.280 inches, respectively, as shown in FIGS. 2A and 2B. The thickness d at an end 32 of the composite shim 30 is approximately 0.035 inches. In an alternative embodiment, the composite shim can include a length, width and thickness of approximately 12 inches, 1.5 inches and 5/16 inches, respectively.

As shown in FIG. 2A, the composite shim 30 includes a number of cored regions 34 which are spaced apart from one another at a distance e along the width and a distance f along the length of approximately 0.456 inches. The cored regions 34 are cylindrical in shape and have a diameter g of approximately 0.32 inches as shown in FIG. 2C. The cored regions 34 extend through a portion of the composite shim 30 to a distance h of approximately 0.06 inches from a base 36 of the composite shim 30 as further shown in FIG. 2C. In an embodiment, the cored region has a substantially cylindrical shape that is tapered about an angle $\alpha$, such as an angle of about 8° as shown in FIG. 2C.

As shown in FIG. 2A, the composite shim 30 includes eleven rows of cored regions 34. The first row 38 includes two cored regions spaced from an end region 40 of the composite shim 30 at a distance i of approximately 0.08 inches. The end region 40 includes a groove 42 positioned between the two cored regions of the first row 38. The composite shim 30 includes additional rows of cored regions wherein each row 44 includes three cored regions as further illustrated in FIG. 2A.

As previously discussed, the composite products of the present invention can be formed into a number of different shapes and sizes. As shown in FIG. 3, the composite shim 46 is similar in shape to the composite shim as shown in FIGS. 1 and 2A-2C. However, the composite shim 46 includes an additional cored region 48 positioned along a row 50 nearest an end 52 of the composite shim.

Figure 4A:
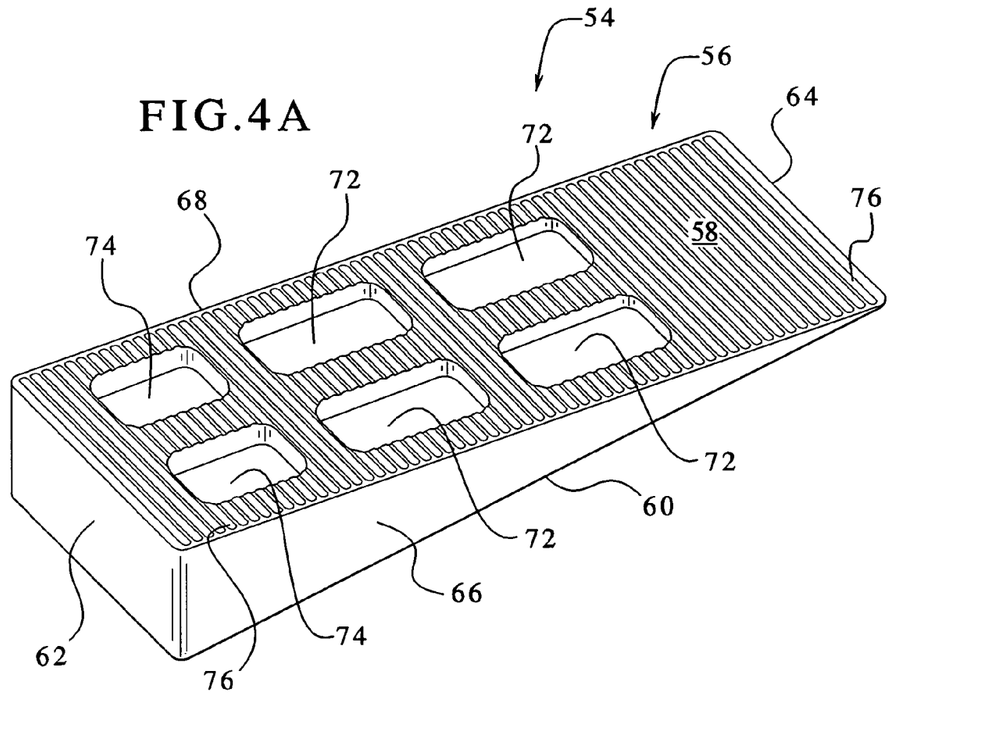
FIG. 4A illustrates a perspective view.
Figure 4B:
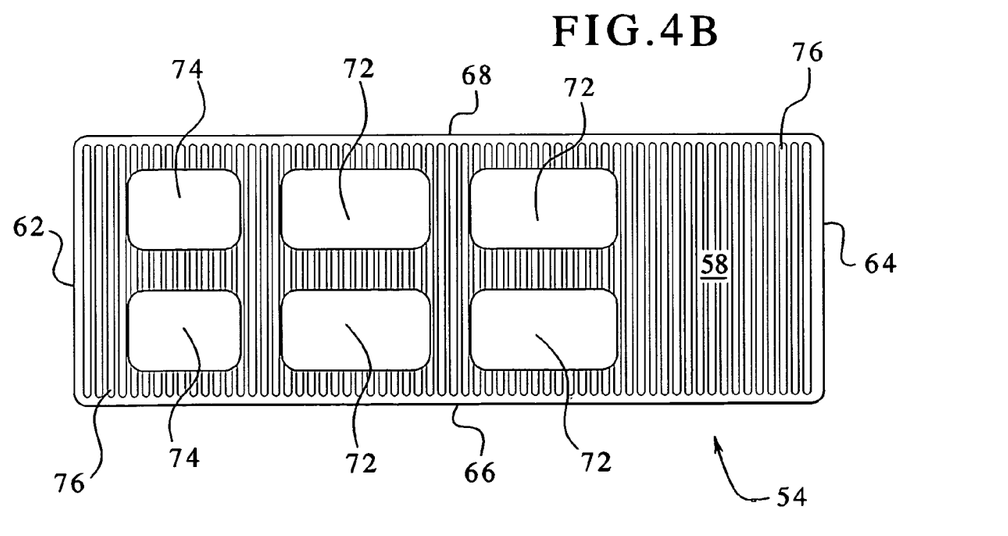
FIG. 4B illustrates a top view.

In an embodiment, the present invention includes a wedge-shaped composite product as shown in FIGS. 4A-4B. The wedge composite 54 is generally defined by five surface or face regions which meet to form the wedge-shaped body 56. The face regions 58 and 60 are distanced apart at an end region 62 which provides the thickest portion of the composite wedge. The face regions 58 and 60 extend from the end region 62 to meet at an edge 64 opposite the end region 62 thereby forming the tapered wedge-shaped body. The other face regions 66 and 68 define the remaining portions of the wedge composite. FIG. 4B illustrates a top view of the composite wedge 54 of FIG. 4A.

In an embodiment, the wedge-shaped body 56 includes one or more cored regions 72 extending through a portion of the wedge-shaped body. The cored regions 72 can include a variety of suitable and different shapes and combinations thereof. In an embodiment, the wedge-shaped body 56 includes three rows of a pair of cored regions 72. As shown in FIGS. 4A and 4B, the cored regions 72 have a similar oblong shape. In an embodiment, the cored regions 74 nearest the end region 62 are smaller in size than the remaining other cored regions 72. In an embodiment, the cored regions can be positioned along the wedge-shaped body up to about three quarters of a length of the wedge-shaped body on one side or on two opposite facing sides. The cored regions can act to reduce the weight of the wedge composite while not compromising the structural integrity of the wedge composite. In this regard, the wedge composite of the present invention has the ability to withstand up to about 20,000 pound load effectively without slippage and/or compression. The cored regions can also facilitate processing of the composite product as previously discussed.

In an embodiment, the wedge composite includes one or more ripples 76 extending across at least a portion of one or both of the face regions 58 and 60 as shown in FIGS. 4A and 4B. The ripples have a suitable thickness and are spaced apart at an effective distance from one another to provide a rippled surface such that creeping can be prevented, or at least minimized, when the composite wedge is subject to a weight bearing load. It should be appreciated that the rippled surface can be configured in any suitable way.

The wedge composite of the present invention can include a variety of suitable dimensions depending on the application. In an embodiment, the wedge-shaped composite includes a thickness of about 1⅜ inches at the end region 62, a length of about 10 inches, a width of about 3¼ inches and a weight that is comparable to a wood-made wedge. These dimensions make the wedge composite of the present invention particularly suited for setting heavy weight bearing objects, such as manufactured homes.

The composite shim of the present invention can be made in a variety of different and suitable ways. In general, a composite material can be initially formed via a conventional extrusion process under suitable temperatures, pressures and other like process conditions. In this regard, the components of the composite shims are suitably mixed and extruded to form a pellet-sized material or other like-sized or shaped material.

The pre-formed composite material can then be molded to form the composite shim in a variety of different and suitable ways. In an embodiment, the composite material is processed through an injection molding process using temperatures, pressures and setting times in the molding art effective to produce the composite shim. The injection molding process can be carried out in any suitable way. In an embodiment, the injection molding temperature ranges from about 340° F. to about 410° F., preferably from about 390° F. to about 400° F., such that the fiber component of the composite material does not char during the process. In an embodiment, the operating pressure during injection molding ranges from about 1000 pounds (lbs) of pressure to about 1300 lbs of pressure, preferably about 1100 lbs. of pressure.

It should be appreciated that the injection molding process can include a variety of different and suitable equipment components and process parameters effective to produce the composite products of the present invention. For example, the present invention can include a variety of gates and runners sized and positioned in the mold so as to effectively produce the molded composite product(s) of the present invention.

Figure 5A:
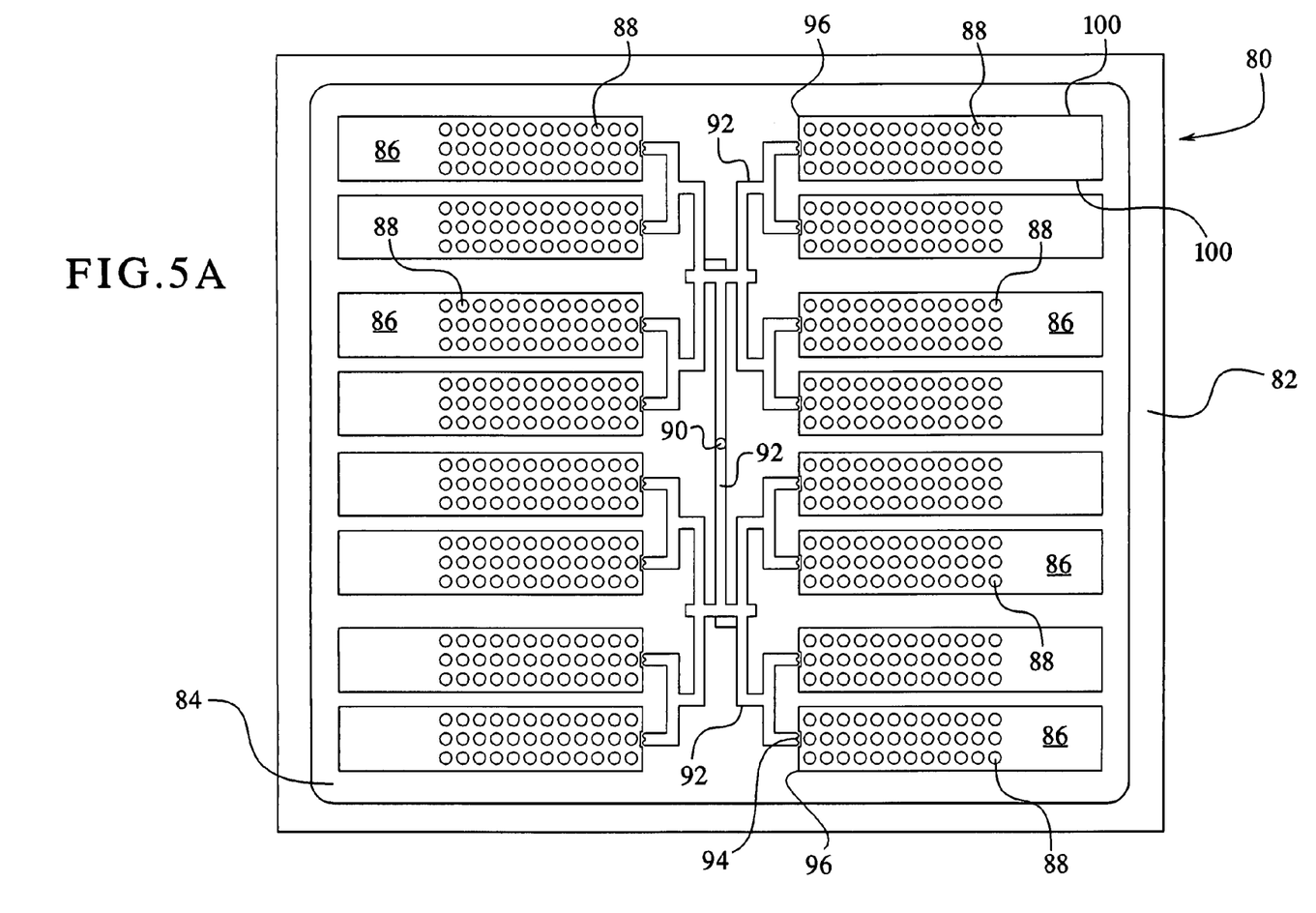
FIG. 5A illustrates a perspective view of the stack mold.
Figure 5B:
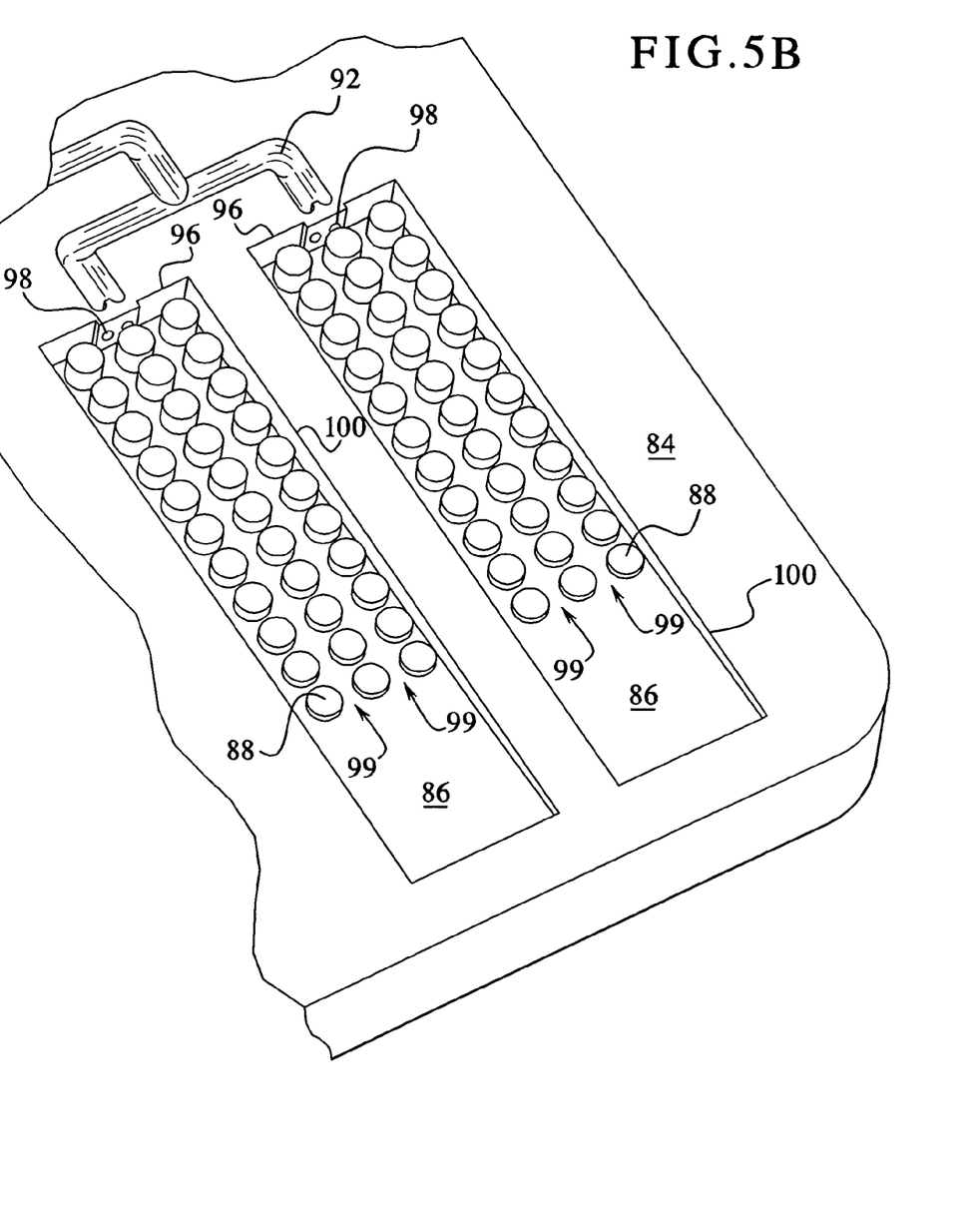
FIG. 5B illustrates a sectional view of the stack mold.

In an embodiment, the composite shim of the present invention can be made with a mold 80 as illustrated in FIGS. 5A and 5B. The mold 80 includes a mold base 82 and a cavity base 84 with a number of cavities 86 provided in the mold base 82. In an embodiment, the mold 80 includes thirty-two cavities wherein the composite shim can be made in a stacked arrangement. In this regard, sixteen cavities are provided on opposite sides of the mold base 82. FIG. 5A illustrates sixteen cavities of one side of the mold base 82. In an embodiment, the cavities 86 on the opposite side (not shown) are essentially the same in shape and size as the cavities 86 shown in FIG. 5A.

Each cavity 86 includes a number of protrusions 88 extending along at least a portion of the cavity 86. As shown in FIG. 5A, a number of the protrusions 88 are arranged in a number of rows with three protrusions in each row. The protrusions 88 are used to form the cored regions of the composite shim as discussed above.

During injection molding, the composite melt is injected into the cavity base 84 through an injection hole 90 as shown in FIG. 5A. The composite melt can then flow into each of the cavities 86 via a network of runners 92 positioned along the cavity base. Before flowing directly into the cavities 86, the composite flows through a gate 94 positioned at an end portion 96 of the cavities 86. This end 96 corresponds to the end region of the composite shim at a maximum thickness of the composite shim as discussed above. In an embodiment, the gate 94 includes two holes 98 located at a substantially equidistant position relative to a center portion of the gate 94 as illustrated in FIG. 5B. The number, positioning, sizing and construction of the gate allows the composite melt to flow more easily through the channels 99 of the cavity 86 in both lengthwise and width-wise fashion thereby facilitating the injection molding process. In an embodiment, the holes 98 have a diameter of about 0.080 inches. In an embodiment, thirty-two composite shims can be degated from the stack mold approximately every twenty-nine seconds during processing.

In an embodiment, the cavities 86 include a draft (not shown) on the side regions 100. This allows the side regions 100 to be angled such that the composite shim can be more easily removed from the cavity 86 during processing.

By way of example and not limitation, the present invention is described below in the following examples.

Example I

An experimental test was conducted to evaluate the creep properties of a composite shim made in accordance with an embodiment of the present invention. The test was also conducted on wood-made shims for comparison. In general, a number of each type of test shim were placed in a stacked arrangement and subject to a specific load. The change in stack height was measured initially and after one hour. The types of shims used in the experiment included composite shims made with a 70% thermoplastic component (70%) and 60% thermoplastic component (60%) in accordance with an embodiment of the present invention and shims made from jute, cedar and pine. As indicated below in Table I, the composite shims displayed better creeping properties when subject to the load initially and over time as compared to the wood-made shims.

TABLE I

| Specimen ID | Change in Stack Height @ Initial Load to 200 pounds (%) | Change in Stack Height after 1 Hour with 200 pounds (%) |
| --- | --- | --- |
| 70% | 1.3 | 0.3 |
| 60% | 1.3 | 0.7 |

TABLE I-continued

| Specimen ID | Change in Stack Height @ Initial Load to 200 pounds (%) | Change in Stack Height after 1 Hour with 200 pounds (%) |
| --- | --- | --- |
| Jute | 2.7 | 0.7 |
| Cedar | 0.4 | 2.9 |
| Pine | 1.6 | 0.5 |

Example II

An experimental test was conducted to evaluate the split resistance properties of a composite shim made in accordance with an embodiment of the present invention. The test was also conducted on wood-made shims for comparison. The tested shims included composite shims made from 60% thermoplastic (60%), 60% thermoplastic at reduced weight (60%-reduced weight) and 70% thermoplastic (70%) in accordance with an embodiment of the present invention and shims made from jute, pine and cedar.

Two-inch nails were driven through a 1 inch cedar board cover then through two shims into a 2×4 stud backing while the shims were at 20° F. Prior to nailing, the cover, shims and backing were placed in a 20° F. cooling chamber for 1 hour. Brads were nailed 1 inch, 1.5 inch and 4 inches from the end of the shim stack. Nailing was accomplished with a pneumatic nail gun using 2 inch brads @ 50 psi air pressure. The 70%, 60%, 60%-reduced weight, jute and pine shims exhibited no splitting between nails. The cedar shims had splitting between the end of the shim stack and the 1-inch nail and between the 1.0 inch and 1.5 inch placed nails.

Example III

This test evaluated how much energy was required to snap a shim. All the shims were broken at the same thickness of 0.23 inches. The same type of shims were tested as tested in Example II, except that a shim made from jute was not tested. A pendulum impact machine was used to perform the test. A shim was clamped in a suitable fashion into the apparatus exposing 1.10 inch of unsupported shim. At the bottom of the pendulum swing the shim was snapped off and the energy used was recorded. The composite shims were molded smooth on one face and with cored regions on the other face in accordance with an embodiment of the present invention. These specimens were impacted both against the smooth face and against the face with the holes. For comparison purposes, the impact tests were also performed on cedar and pine shims. As can be seen below in Table III, the composite shims made in accordance with an embodiment of the present invention are easier to snap than are the natural wood products. Also, it was consistently easier to snap a composite shim from the hole side than from the smooth side.

TABLE III

| Specimen ID | Average Breaking Energy (ft-lbs) |
| --- | --- |
| 60% with Holes on Impact Side | 0.78 |
| 60% with Holes away from Impact | 1.35 |
| 70% with Holes on Impact Side | 0.85 |
| 70% with Holes away from Impact | 1.38 |
| Jute with Holes on Impact Side | 0.73 |
| Jute with Holes away from Impact | 1.35 |
| 60%-Reduced Weight with Holes on Impact Side | 0.53 |

TABLE III-continued

| Specimen ID | Average Breaking Energy (ft-lbs) |
| --- | --- |
| 60%-Reduced Weight with Holes away from Impact | 0.72 |
| Cedar | 3.07 |
| Pine | 2.57 |

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A composite shim comprising:
a single part construction including a fiber-reinforced base material, the fiber-reinforced base material including a fibrous component and a thermoplastic component wherein the base material is formed into a shim-shaped body that has at least two rows of cored regions including one or more cored regions not exceeding three in number extending in a widthwise direction in each row along a first side of the shim-shaped body and through a portion of the shim-shaped body, wherein at least one of the rows includes three cored regions, wherein the rows of cored regions are positioned along the shim up to about two thirds of a length of the first side, wherein the shim-shaped body includes a second side opposite the first side, wherein the first side and second side converge to a tapered edge along a converging distance between the first and second sides, wherein the cored regions extend a distance between the first and second sides that is less than the converging distance, wherein the cored regions are structured and positioned so as to enable the composite shim to be secured while minimizing an amount of force exerted to the shim, thereby halting propagation of splitting caused by securing the composite shim through piercing at least one of the cored regions of the shim, and wherein the second side has a smooth surface that extends along an entire length of the second side.

2. The composite shim of claim 1, wherein the thermoplastic component is selected from the group consisting of polyethylene, polyesters, polystyrene, polycarbonate, polyvinylchloride, poly (methyl methacrylate), nylon, copolymers thereof and mixtures thereof.

3. The composite shim of claim 1, wherein the fibrous component is selected from the group consisting of synthetic fiber, carbon fiber, a cellulosic material, natural fiber, wood flour, birch wood flour, maple wood flour, spruce wood flour, pine wood flour, fir wood flour, rice hull, peanut shells, recyclable wood waste, recyclable paper, flax sheeve and combinations thereof.

4. The composite shim of claim 1, wherein the thermoplastic component ranges from about 30% to about 70% by weight of the composite shim and the fibrous component ranges from about 30% to about 70% by weight of the composite shim.

5. The composite shim of claim 1, wherein the base material comprises an additional component selected from the group consisting of a binder, a coloring agent, a scent agent, an ultraviolet light stabilizer, a filler, a natural filler, a heat stabilizer, an antioxidant, a foaming agent, a fungicide and combinations thereof.

6. The composite shim of claim 1, wherein the composite shim is non-weight bearing in size.

7. The composite shim of claim 1, wherein two or more of the rows include three cored regions.

8. The composite shim of claim 1, wherein the first and second sides converge from a third side that includes a recess.

9. The composite shim of claim 1, wherein the first side has a smooth surface that extends along an entire length thereof.

10. The composite shim of claim 1, wherein at least one of the rows of cored regions includes two cored regions and optionally includes a third cored region.

11. The composite shim of claim 1, wherein the length of the first side and the second side does not exceed about twelve inches, the converging distance does not exceed about 5/16 inches, and the width does not exceed about 1.5 inches.

12. The composite shim of claim 1, wherein the cored regions are tapered.

13. The composite shim of claim 1, wherein the cored regions extend approximately 0.06 inches between the first and second sides.

14. The composite shim of claim 1, wherein each of the cored regions are tapered at an angle of about eight degrees.

15. The composite shim of claim 1, wherein the cored regions are spaced apart from one another along the length of the first side by approximately 0.456 inches.

16. The composite shim of claim 1, wherein each cored region is cylindrical and has a diameter of approximately 0.32 inches.

17. The composite shim of claim 1, wherein the length of the first side and the second side does not exceed about eight inches, the converging distance does not exceed about 0.28 inches, and the width does not exceed about 1.5 inches.

* * * * *